(12) United States Patent
Eromäki

(10) Patent No.: US 7,682,092 B2
(45) Date of Patent: Mar. 23, 2010

(54) CAMERA SHUTTER ASSEMBLY HAVING CASING WALLS FOR GUIDING A SHUTTER AND METHOD FOR PRODUCING SAME

(75) Inventor: Marko Eromäki, Tampere (FI)

(73) Assignee: Nokia Corporation, Espoo (FI)

( * ) Notice: Subject to any disclaimer, the term of this patent is extended or adjusted under 35 U.S.C. 154(b) by 289 days.

(21) Appl. No.: 11/821,556

(22) Filed: Jun. 21, 2007

(65) Prior Publication Data

US 2008/0317460 A1    Dec. 25, 2008

(51) Int. Cl.
*G03B 9/10* (2006.01)
*G03B 9/08* (2006.01)

(52) U.S. Cl. .................. 396/493; 396/452; 396/471; 396/484; 396/496; 348/368

(58) Field of Classification Search .............. 396/496, 396/450, 493, 452
See application file for complete search history.

(56) References Cited

U.S. PATENT DOCUMENTS

| | | | | |
|---|---|---|---|---|
| 4,005,462 A | * | 1/1977 | Papke | 396/487 |
| 4,802,442 A | * | 2/1989 | Wilson | 119/166 |
| 5,040,017 A | * | 8/1991 | Arai | 396/244 |
| 6,467,975 B1 | * | 10/2002 | Tsuzuki et al. | 396/449 |
| 2005/0179803 A1 | | 8/2005 | Sawai | 348/335 |
| 2008/0050112 A1 | * | 2/2008 | Wernersson | 396/463 |

FOREIGN PATENT DOCUMENTS

GB    2 424 715    10/2006
WO    WO2006/112353    10/2006

* cited by examiner

*Primary Examiner*—W. B. Perkey
*Assistant Examiner*—Bret Adams
(74) *Attorney, Agent, or Firm*—Ware, Fressola, Van Der Sluys & Adolphson, LLP

(57) ABSTRACT

A shutter assembly has an actuator for applying a whip action on a shutter wing for blocking or exposing an aperture. The shutter wing has a first blade fixedly connected to the actuator and a second blade movably connected to the first blade. When the shutter wing is in the closed position, the blades form a folded shape with a waist section large enough to cover the entire aperture. When the shutter wing is in the open position, the blades form an extended shape having a narrower waist section. The blades can be connected to each other by a hinge or a wire. Two shutter wings located on opposite sides of the aperture can be used to create a gap therebetween to control the exposure in a camera. As the shutter wings move from one side to another, the gap acts like a moving slit across the aperture.

20 Claims, 10 Drawing Sheets

CAMERA SHUTTER ASSEMBLY HAVING CASING WALLS FOR GUIDING A SHUTTER AND METHOD FOR PRODUCING SAME

FIELD OF THE INVENTION

The present invention relates generally to a camera shutter.

BACKGROUND OF THE INVENTION

Typically in cameras, there are mechanical shutters used to control the exposure time of an acquired image. Shutter allows a certain amount of light to pass to the imaging sensor within a certain timeframe. By using a high-speed shutter, the image can be captured instantly in order to reduce or eliminate motion blur and a sharper image can be achieved. The shutter also allows more time to be used for transferring the image from the imaging sensor to an image processor by preventing new exposure. The shutter enables synchronization with the use of xenon flash, for example. Generally shutters are mechanical components containing one or more blades to implement the closing function.

Minituarization has currently become a problem with the conventional shutter structures. It is generally difficult to achieve an ultra fast shutter (e.g $1/4000$ second) only with shutter blades in a conventional shutter design. When using bright xenon flash with the camera, an additional moving neutral density filter is typically used in a conventional shutter unit. This additonal moving part adds to the complexity of shutter design.

It would be advantageous and desirable to achieve a fast shutter unit that can be used in a miniature camera or in a mobile phone camera.

SUMMARY OF THE INVENTION

A shutter assembly has a shutter wing for blocking an aperture in a camera when exposure is not needed. The shutter wing is divided into two halves movably connected to each other. One half is a first blade connected to an actuator for rotating the shutter wing between a closed position and an open position. The other haft is a second blade movably connected to the first blade. When the shutter wing is in the closed position, the first and second blades are folded so that the waist section of the shutter wing is wide enough to cover the entire aperture. When the shutter wing is in the open position, the first and second blades are unfolded and the shutter wing has an extended shape instead of a folded shape. The extended shape has a narrower waist section so that the shutter wing can be fitted into a smaller space around the aperture.

According to one embodiment of the present invention, two shutter wings can be used to control the exposure in a camera. In this dual-wing design, the shutter assembly has two foldable shutter wings, each located on one side of the aperture. When the shutter is open for exposure, the shutter wings are simultaneously moved from one side of the aperture to the other. By controlling the start time of one shutter wing relative to the other, a gap, formed between two moving shutter wings, creates a moving slit across the aperture until the shutter reaches its closed position.

Thus, the first aspect of the present invention is a shutter which comprises:
  a first shutter blade, and
  a second shutter blade rotatably connected to the first shutter blade, wherein the shutter is operable between a first position blocking an aperture and a second position exposing the aperture, and wherein
  when the shutter is located in the first position, the first shutter blade and the second shutter blade form a folded shape with a waist section larger than the aperture, and
  when the shutter is located in the second position, the first shutter blade and the second shutter blade form an extended shape with a reduced waist section.

The first shutter blade has a first end and a second end, and wherein the first end is adapted for connecting to an actuator via a shaft to allow the shutter to move between the first and the second positions, and the second end can be movably connected to the second shutter blade via a hinge or a wire, for example.

The second aspect of the present invention is a method for controlling exposure in a camera having an aperture. The method comprises:
  providing a first shutter blade having a first end and a second end, the first end connected to an actuator for rotational movement between a first position and a second position;
  rotatably connecting a second shutter blade to the second end of the first shutter blade, wherein
  when the first shutter blade is located in the first position, the first and second shutter blades form a folded shape over the aperture, and
  when the first shutter blade is located in the second position, both the first and second shutter blades are located away from the aperture and the first and second shutter blades form an extended shape with a reduced waist section.

The third aspect of the present invention is a shutter assembly, which comprises:
  a casing having an aperture; and
  a shutter disposed adjacent to the aperture, said shutter comprising:
   a first shutter blade, and
   a second shutter blade rotatably connected to the first shutter blade, wherein the shutter is operable between a first position blocking the aperture and a second position exposing the aperture, and wherein
   when the shutter is located in the first position, the first shutter blade and the second shutter blade form a folded shape with a waist section larger than the aperture, and
   when the shutter is located in the second position, the first shutter blade and the second shutter blade form an extended shape with a reduced waist section.

According to one embodiment of the present invention, the first shutter blade has a first end and a second end, and the shutter assembly further comprises:
  an actuator mounted on the casing, wherein the first end is adapted for connecting to the actuator to allow the shutter to move between the first and the second positions, and the second end is movably connected to the second shutter blade.

According to another embodiment of the present invention, the casing surface has a first side and an opposing second side and the aperture is provided on the casing surface between the first side and the second side, wherein
  the shutter is located on the first side when the shutter is located in the first position and the actuator is adapted for moving the shutter from the first side toward the second side to the second position, said shutter assembly further comprising:
  a second shutter disposed on the second side, the second shutter comprising:
   a third shutter blade rotatably connected to a second actuator, and
   a fourth shutter blade rotatably connected to the third shutter blade, wherein the second shutter is operable between a third position blocking the aperture and a fourth position exposing the aperture, and wherein when the second shutter is located in the third position, the third shutter blade and the fourth shutter blade form a folded shape with a waist section larger than the aperture;

when the second shutter is located in the fourth position, the third shutter blade and the fourth shutter blade form an extended shape with a reduced waist section; and the second shutter is located on the second side when the second shutter is located in the third position and the second actuator is adapted for moving the second shutter from the second side toward the first side to the fourth position, such that only one of the first and second shutters is adapted to block the aperture at a time.

According to the present invention, the first and second shutters are adapted to move between the first side and the second side in a moving direction, forming a gap between the first and second shutters, wherein the first and second actuators are adapted for moving the first and second shutters independently in a coordinated fashion so as to adjust the gap between the first and second shutters.

The shutter and the shutter assembly of the present invention can be used in a camera, a mobile phone or the like.

Thus the fourth aspect of the present invention is a device which comprises:

an imaging sensor;

an optical unit for forming an image on the imaging sensor with light through an aperture;

a shutter disposed adjacent to the aperture, said shutter comprising:

a first shutter blade, and a second shutter blade rotatably connected to the first shutter blade, wherein the shutter is operable between a first position blocking the aperture and a second position exposing the aperture, and wherein when the shutter is located in the first position, the first shutter blade and the second shutter blade form a folded shape with a waist section larger than the aperture, and when the shutter is located in the second position, the first shutter blade and the second shutter blade form an extended shape with a reduced waist section.

The device can be a camera or an imaging device in a mobile phone or other electronic device.

The present invention will become apparent upon reading the description taken in conjunction with FIGS. 1 to 11.

DETAILED DESCRIPTION OF THE PRESENT INVENTION

Figure 1A:
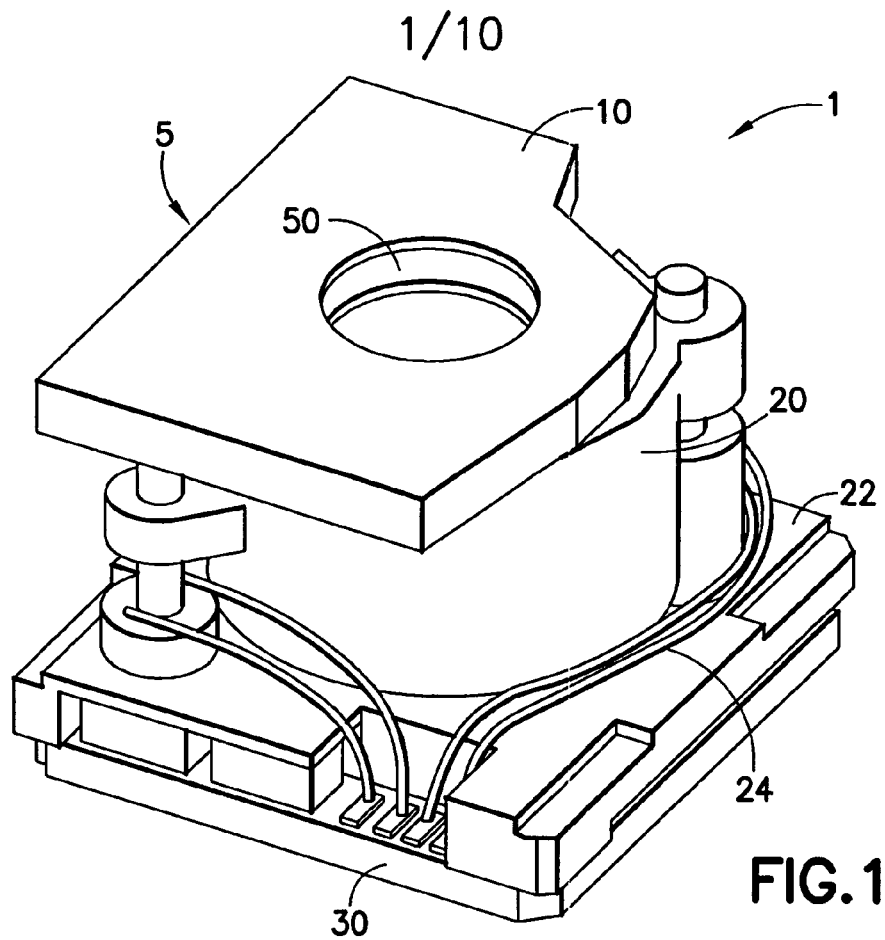
FIG. 1a is an isometric view of an imaging module, according to one embodiment of the present invention.
Figure 1B:
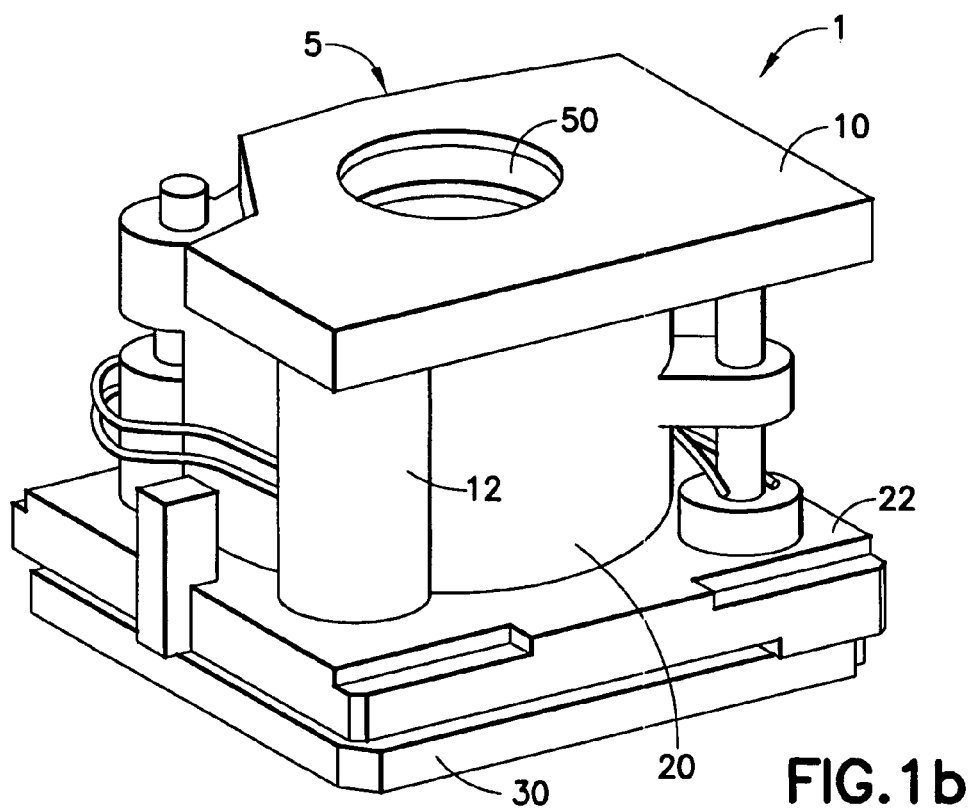
FIG. 1b is another isometric view of the imaging module.

The present invention relates to a camera shutter. The shutter assembly, according to one embodiment of the present invention, has one movable wing to achieve a whip action in a closing or opening function. The moving wing is disposed in a casing with an aperture. As shown in FIGS. 1a and 1b, the shutter assembly 5 has a casing 10 to house the movable wing. The casing 10 can be integrated into an imaging module 1. The imaging module 1 contains an optical unit 20 and a printed-circuit (PC) or printed wire (PW) board 30. Light is allowed to reach the optical unit when the aperture 50 is not blocked by the movable wing hidden inside the casing. It is possible to dispose an imaging sensor in the imaging module or at a location separate from the imaging module 1. As shown in FIGS. 1a and 1b, the imaging module 1 has a mounting support 22 for mounting the optical unit 20. The casing 10 includes an actuator 12 disposed on a casing surface 11 to control the movement of the shutter for effectively closing or opening the aperture 50. The PWB 30 has terminal pads for connecting two power cables 24 to the actuator 12.

Figure 2:
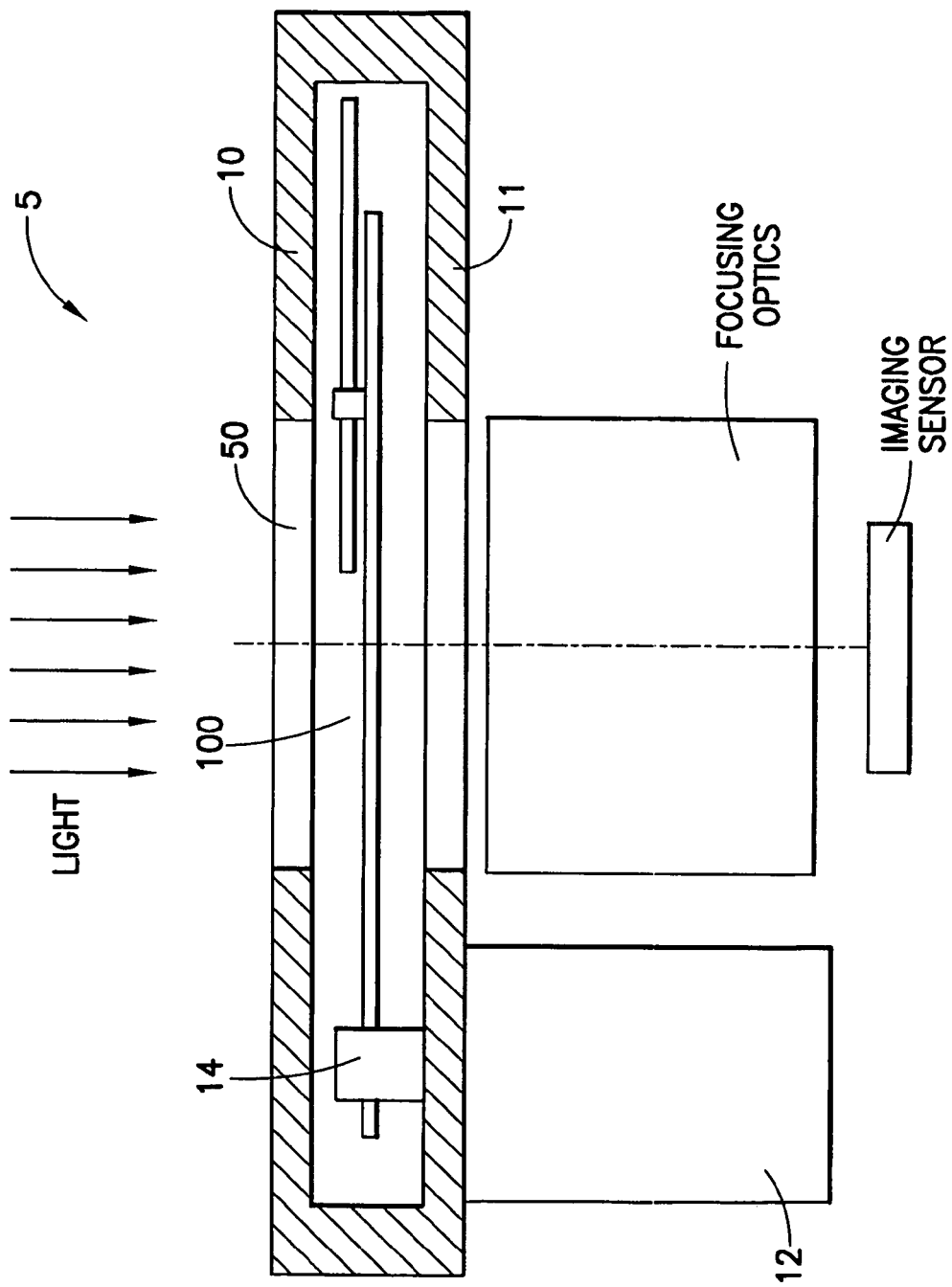
FIG. 2 is a cutout view of the shutter assembly, according to one embodiment of the present invention.

FIG. 2 is a cutout view of the shutter assembly 5. As shown, the shutter assembly 5 has a shutter wing 100 mounted on an actuator shaft 14 so that the actuator 12 can create a rotation movement for the shutter wing 100. The actuator can be a motor, a solenoid or the like. The shutter wing 100 can be separated from the focusing optics.

Figure 3B:
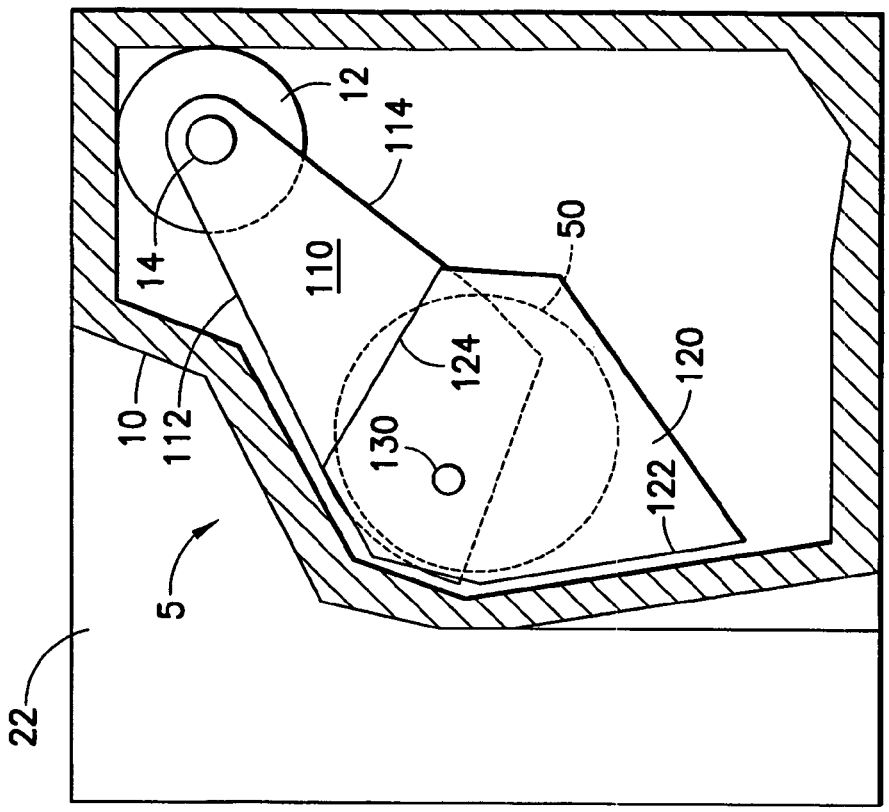
FIG. 3 is another cutout view of the shutter assembly.
Figure 3A:
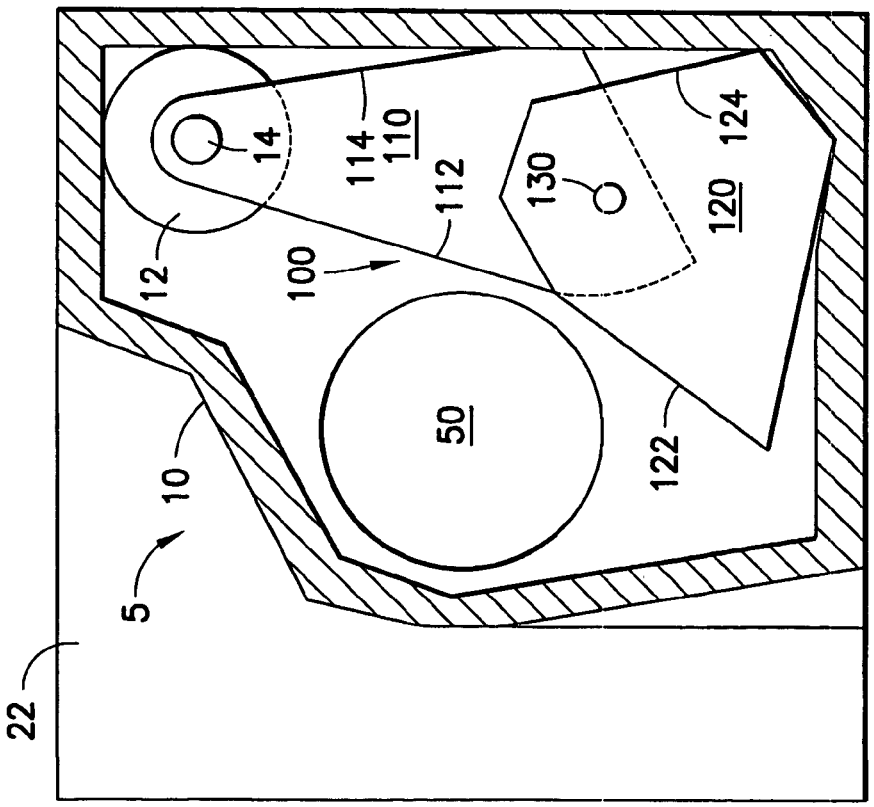
Figure 4C:
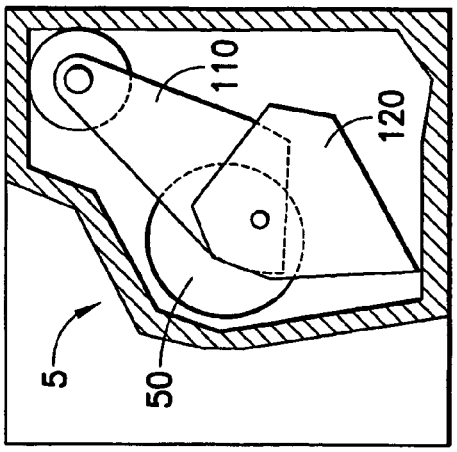
FIGS. 4a to 4f show a sequence of shutter-wing movement for a shutter from a closed position to an open position.
Figure 4F:
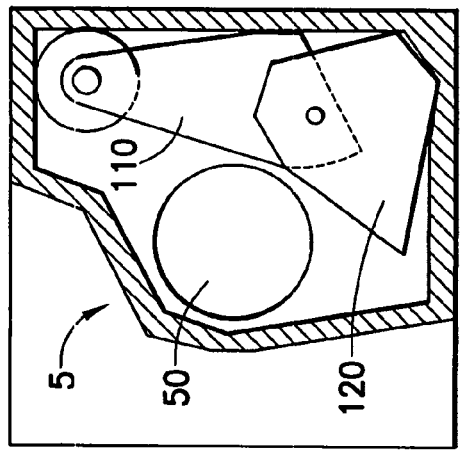
Figure 4B:
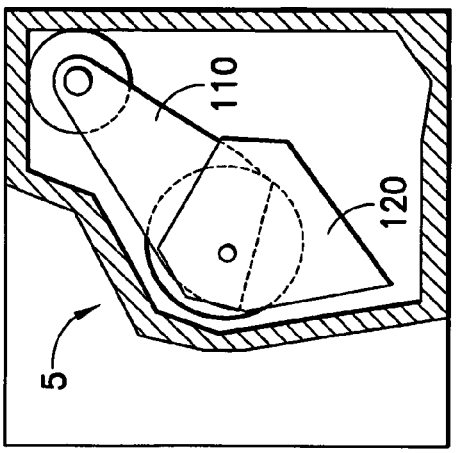
Figure 4E:
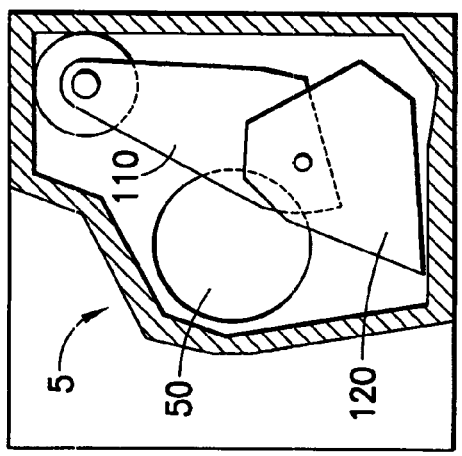
Figure 4A:
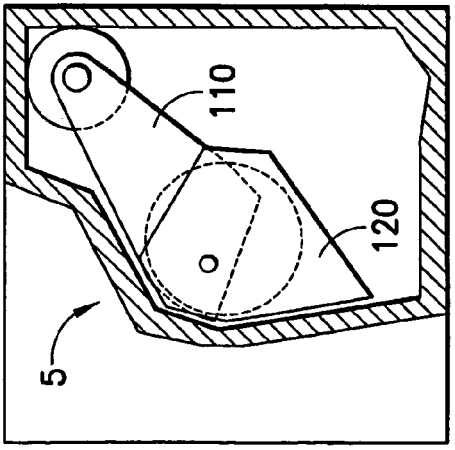
Figure 4D:
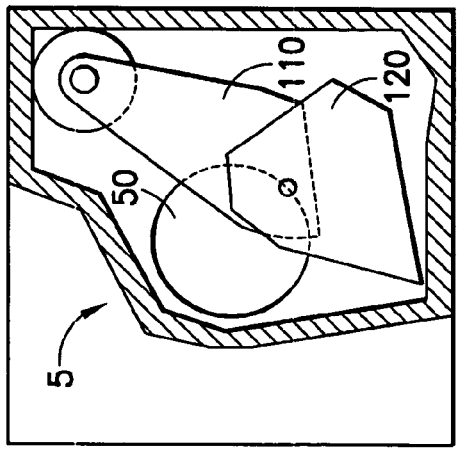
Figure 5C:
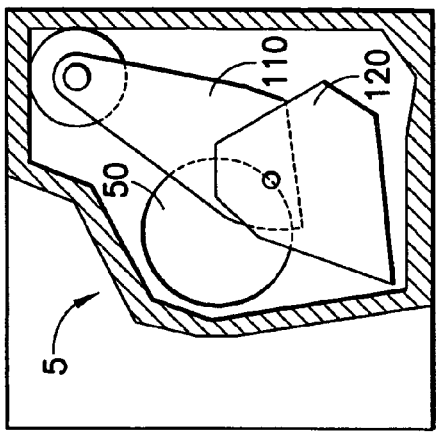
FIGS. 5a to 5f show a sequence of shutter-wing movement for the shutter from an open position to a closed position.
Figure 5F:
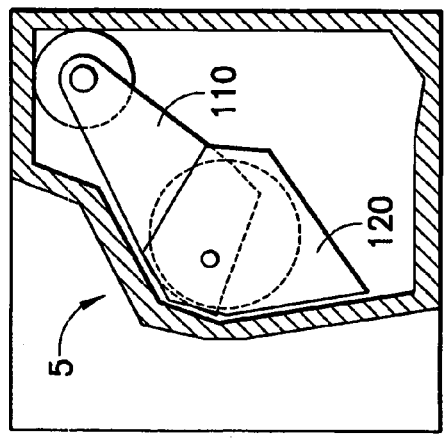
Figure 5B:
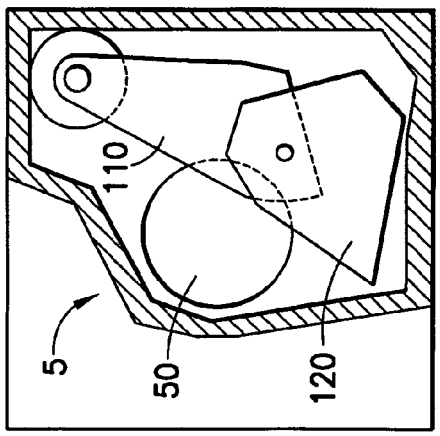
Figure 5E:
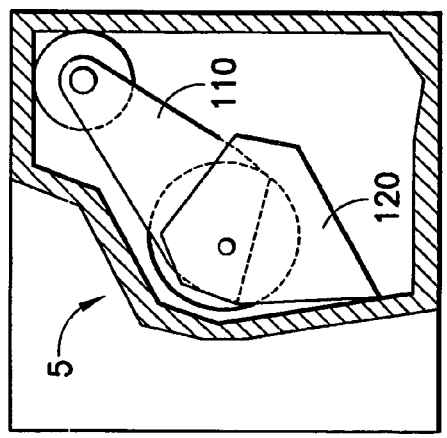
Figure 5A:
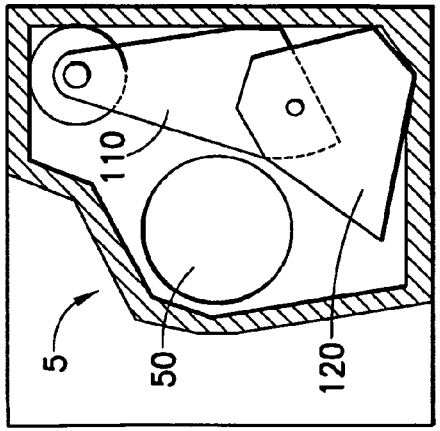
Figure 5D:
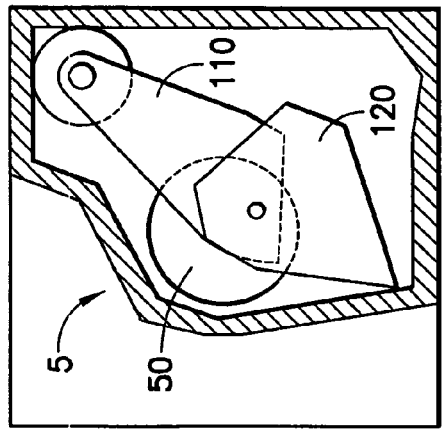

As shown in FIGS. 3a and 3b, the shutter wing 100 is split into two halves or blades movably connected by a hinge. As shown, a first blade 110 is fixedly mounted to the actuator shaft 14 and a second blade 120 is rotatably connected to first blade 120 by a hinge 130 so as to allow the second blade to move relative to the first blade. The first blade 110 has a first edge 112 and a second edge 114, and the second blade 120 has a first edge 122 and a second edge 124. The hinge 130 is located between the first edge and the second edge of the first and second blades.

When the shutter assembly 5 is used in a digital camera, the shutter wing 100 is moved to its open position (FIG. 3a) to expose the aperture 50 when no images are taken. The image formed on the imaging sensor can be used for viewfinding or for video recording. Furthermore, the image can be used for white balancing before a picture is taken. When a user presses the capture button on the camera in order to take a picture, the shutter wing 100 will be moved to its closed position, as shown in FIG. 3b. At this shutter position, the image sensor can be darkened or the pixels are reset before an image is captured.

It should be noted that the relative position between the first blade 110 and the second blade 120 in FIG. 3a is different that in FIGS. 3a and 3b. When the shutter wing 100 is in its closed position as shown in FIG. 3b, the blades form a fold shape having a middle or waist section large enough to cover the entire circular aperture 50. As shown in FIG. 3b, the blades form an extended shape with a reduced waist section, smaller than that in the closed position. The foldable blades require much less space around the aperture as compared to a shutter with a single blade. Such a shutter wing construction allows miniaturization possibilities for a small shutter assembly. When the shutter wing 100 is in its open position, as shown in FIG. 3a, the shutter wing is capable of shaping itself into a different compact form. Because the second blade is movably connected to the first blade, the position of the second blade relative to the first blade is determined by the shape of the inner walls of the casing and by the whipping action when the shutter wing is moved from one position to another. Thus, it is sufficient to use only one actuator 12 to move the first blade for opening or closing the shutter. Using the folded blades to block the aperture, the combined area of the first blade and second blade can be minimized in order to achieve an ultra fast shutter with an adjustable exposure time.

Figure 6:
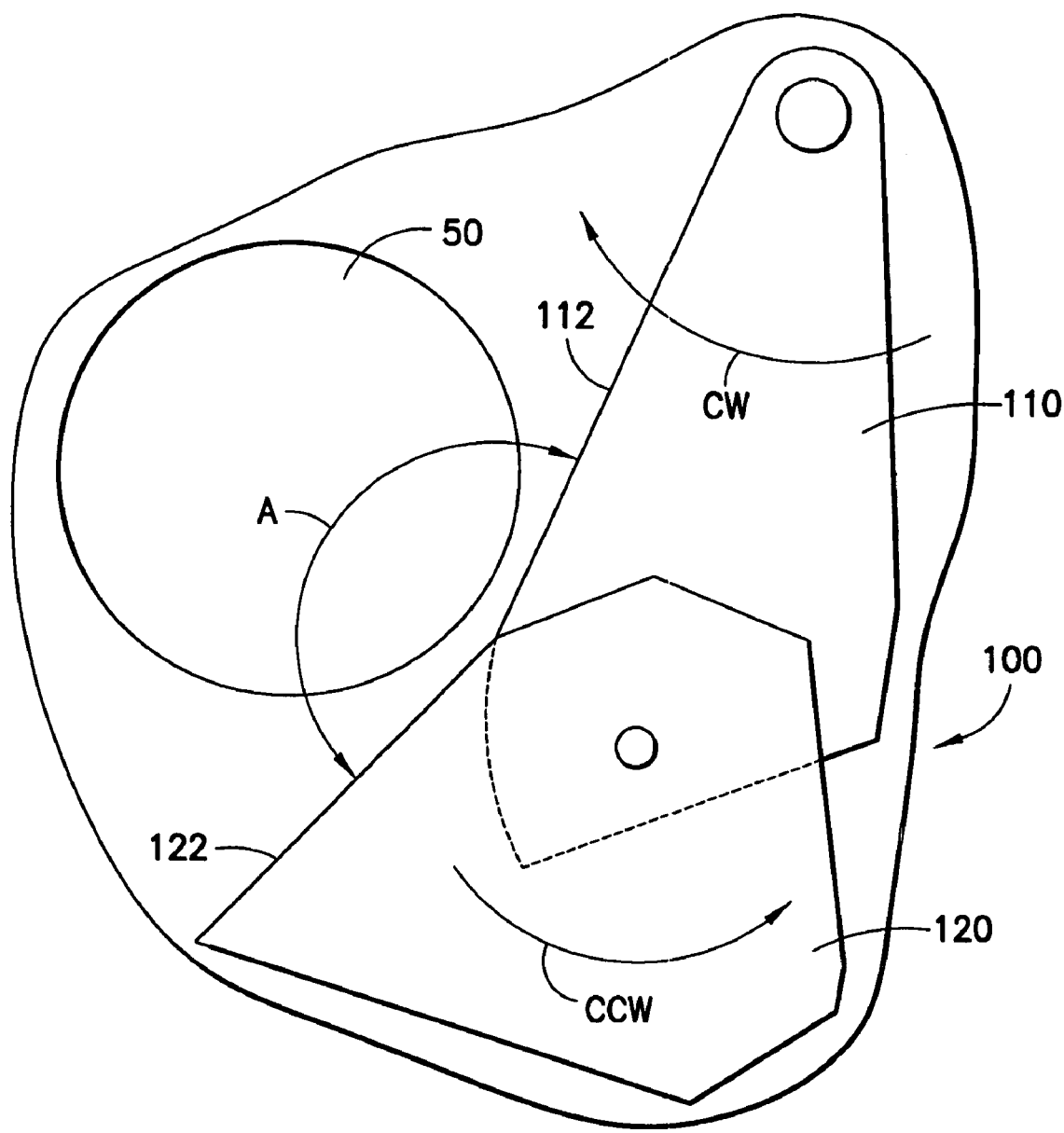
FIG. 6 illustrates the folding of the shutting wing in a shutter assembly, according to one embodiment of the present invention.

After the shutter wing is moved into its closed position following the pressing of the capture button, the shutter is opened to expose the image sensor and then closed again according to the exposure time. FIGS. 4a to 4f show an opening sequence for the shutter wing. FIGS. 5a to 5f show the closing sequence for the shutter wing. In either sequence, when the first blade rotates in a certain rotational direction, the second blade rotates in a different direction due largely to inertia in a whipping action. For example, when the shutter wing 100 is moved from its open position to its closed position, the first blade 110 is moved in a clockwise direction, as shown in FIG. 6. The whipping action causes the second blade 120 to rotate about the hinge 130 in a counter-clockwise direction. As the relative position between the first and second blade changes, the angle A between the first edge 112 of the first blade and the first edge 122 of the second blade is increased.

Figure 7A:
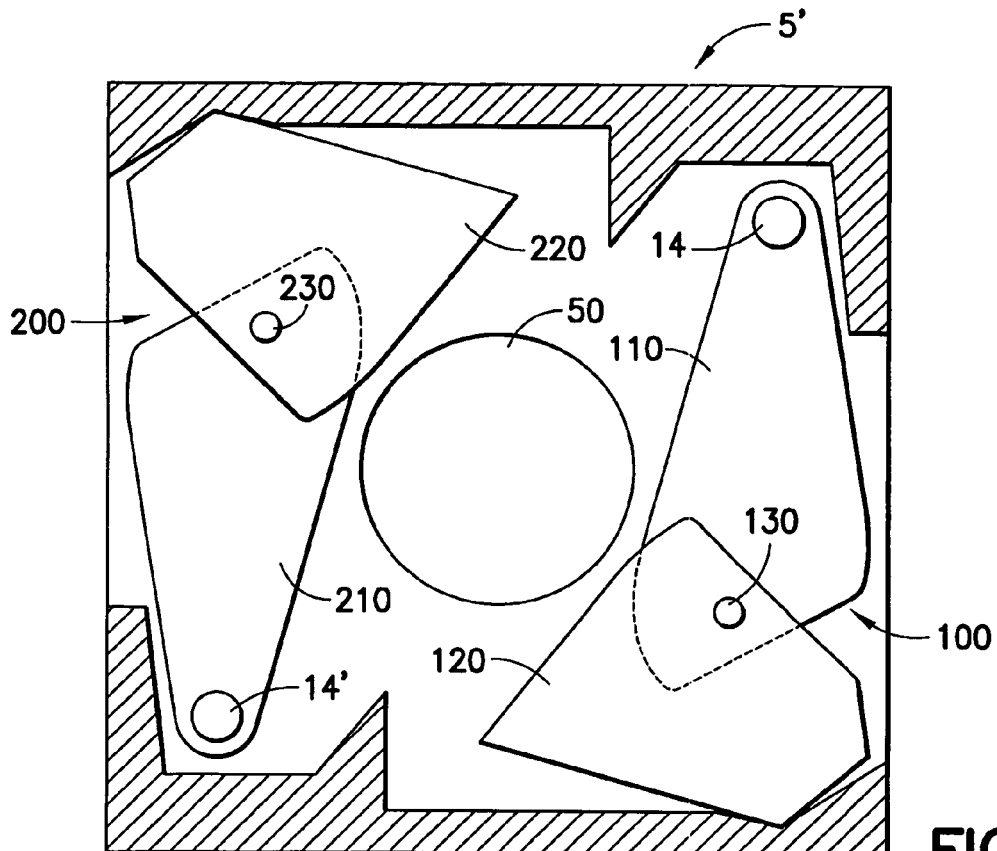
FIG. 7a is a cutout view of the shutter assembly, according to another embodiment of the present invention, when the shutter is in an open position.
Figure 7B:
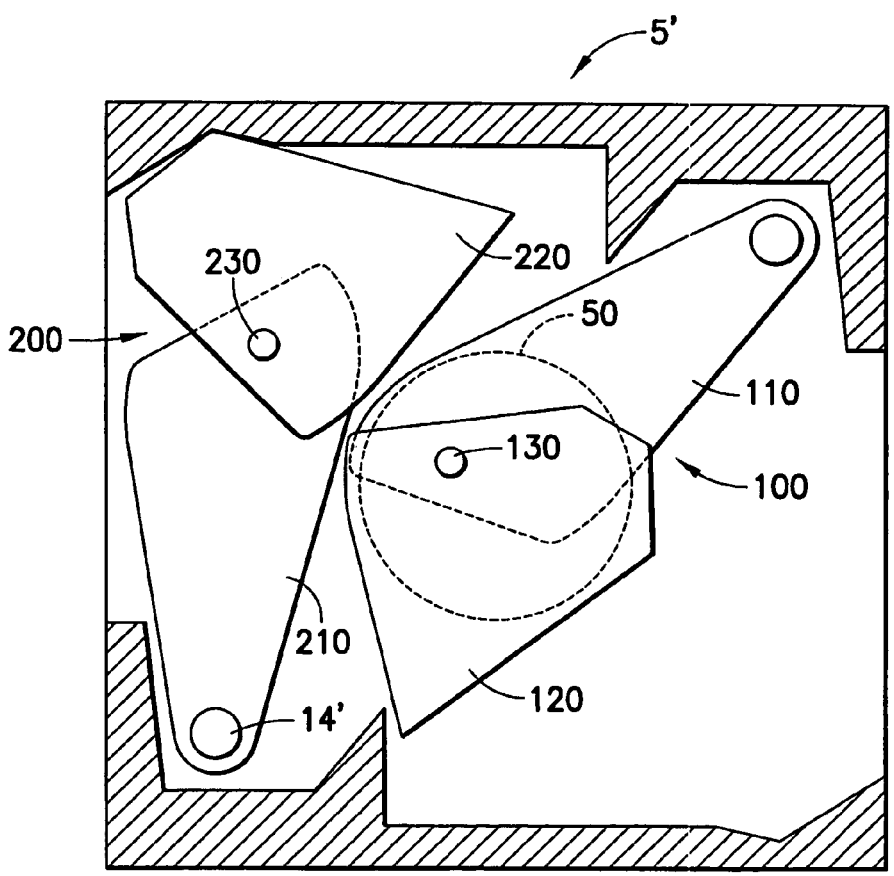
FIG. 7b shows the shutter assembly of FIG. 7a when the shutter is in a closed position.

In a different embodiment of the present invention, two similar shutter wings are used in a shutter assembly. As shown in FIGS. 7a and 7b, the dual-wing shutter assembly 5' has a first shutter wing 100 on one side and a second shutter wing 200 on the other. Two separate actuators (not shown) are used to independently rotate the shutter wings amounted at shafts 14 and 14'. As with the first shutter wing 100, the second shutter wing 200 also has two blades 210 and 220 movably connected by a hinge 230. When the shutter assembly is in an open position, both shutter wings 100 and 200 are moved to their side positions to expose the aperture 50, as shown in FIG. 7a. When the shutter assembly is in a closed position, one of the shutter wings is moved into a folded position to cover the entire aperture, as shown in FIG. 7b.

With the dual-wing shutter assembly, the exposure of an image can be achieved by moving the shutter wings toward one direction. FIGS. 8a to 8f show the opening and closing sequence for the shutter assembly.

Figure 8C:
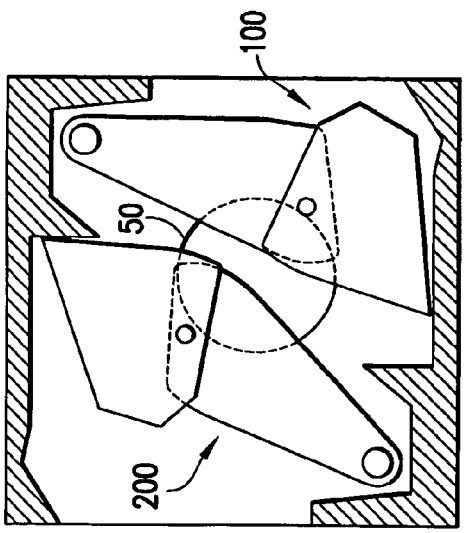
FIGS. 8a to 8b show a sequence of shutter-wing movement for a dual-wing shutter from an exposure position to a closed position.
Figure 8F:
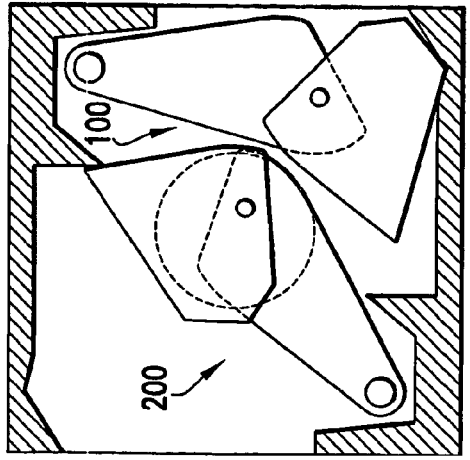
Figure 8B:
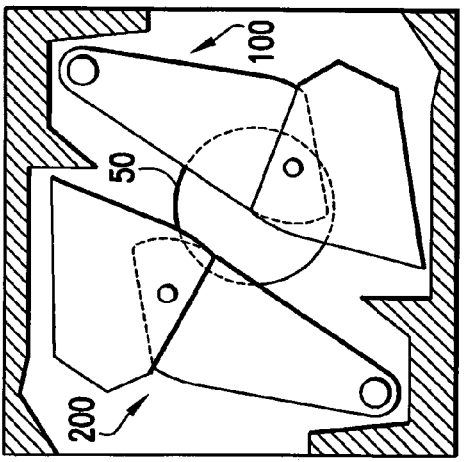
Figure 8E:
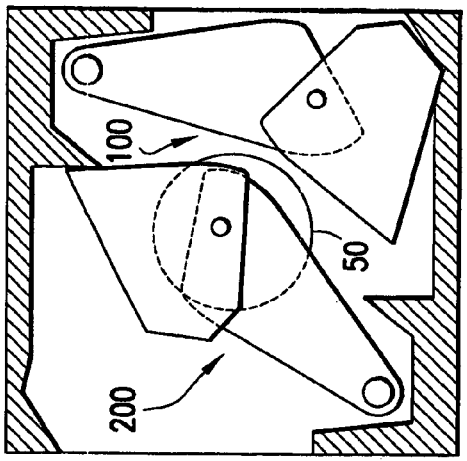
Figure 8A:
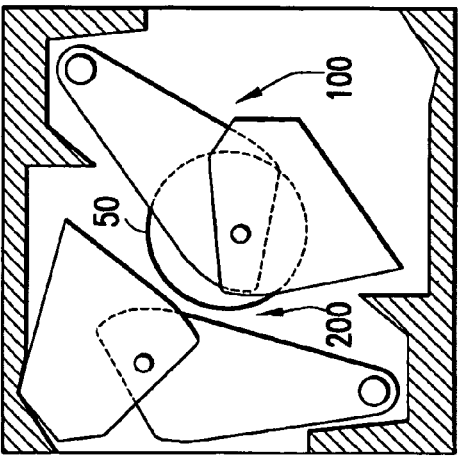
Figure 8D:
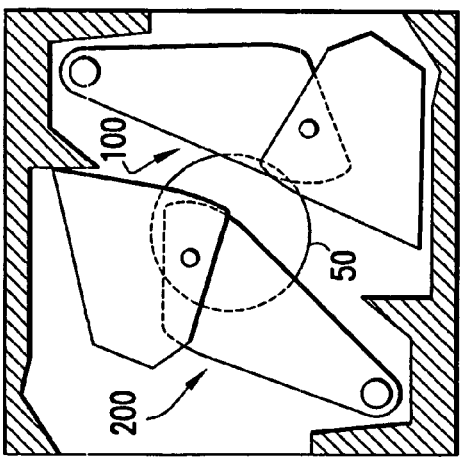

At the start of the exposure period, the shutter wing 100 covers the entire aperture 50 as shown in FIG. 7b, allowing the image sensor to be darkened. It is followed that the first shutter wing 100 is moved away from the second shutter wing 200 to create a certain gap between the two shutter wings, as shown in FIG. 7a, allowing light to pass through the gap. When a desirable gap has been achieved, the second shutter wing 200 is also moved simultaneously with the shutter wing 100, as shown in FIGS. 8b to 8e. The gap between the two shutter wings creates a moving slit across the aperture, revealing one small portion of the aperture at a time. After the first shutter wing 100 has reached its side position, the second shutter wing 200 continues to move toward the first shutter wing 100 until it covers the entire aperture, as shown in FIG. 8f.

This kind of slit-exposure renders possible a very high shutter speed. In addition, since either shutter wing can fully block the aperture, the shutter assembly can be changed from a closed position to an open position and back to the closed position in one movement sequence. Unlike the single-wing embodiment, the shutter wings in the dual-wing design are required to move only once along one direction during the exposure of an image. This one-movement sequence further helps in increasing the shutter speed. Since both of the shutter wings can be actuated independently, the gap and thus the effective exposure time can be adjusted.

Figure 10:
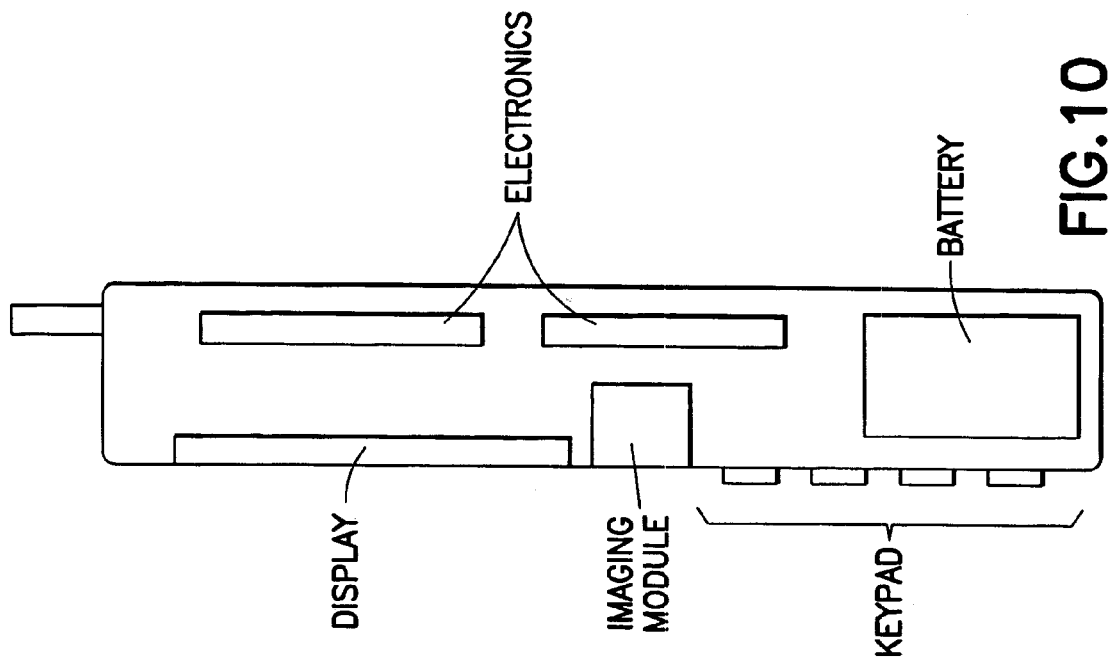
FIG. 10 is a schematic representation of a mobile phone having a shutter assembly of the present invention.
Figure 9:
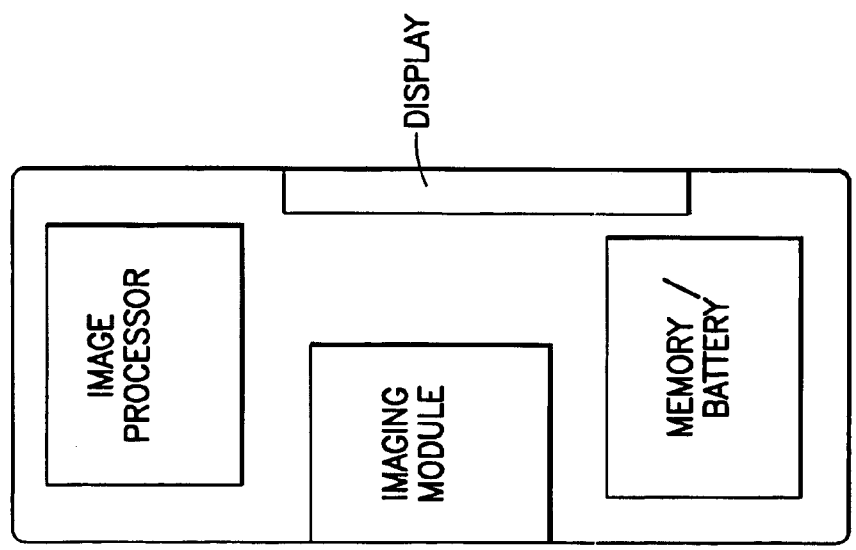
FIG. 9 is a schematic representation of an imaging device having a shutter assembly of the present invention.

Both the single-wing shutter assembly and the dual-wing shutter assembly can be used in a digital camera or in a film camera. They can also be used in a small portable device such as a mobile phone, an MP3 player, a game console, a personal digital assistant (PDA) or the like. FIG. 9 is a schematic representation of a digital camera. The digital camera typically comprises an imaging module which includes the focusing optics, an imaging sensor and the shutter assembly, according to the present invention. The camera further comprises a display which can be used as a viewfinder, an image processing module, and a compartment for battery and memory. FIG. 10 is a schematic representation of a mobile phone which includes a similar imaging module having the shutter assembly, according to the present invention. The mobile phone typically comprises a display, a keypad section and various electronic components for communications and image processing purposes.

Figure 11B:
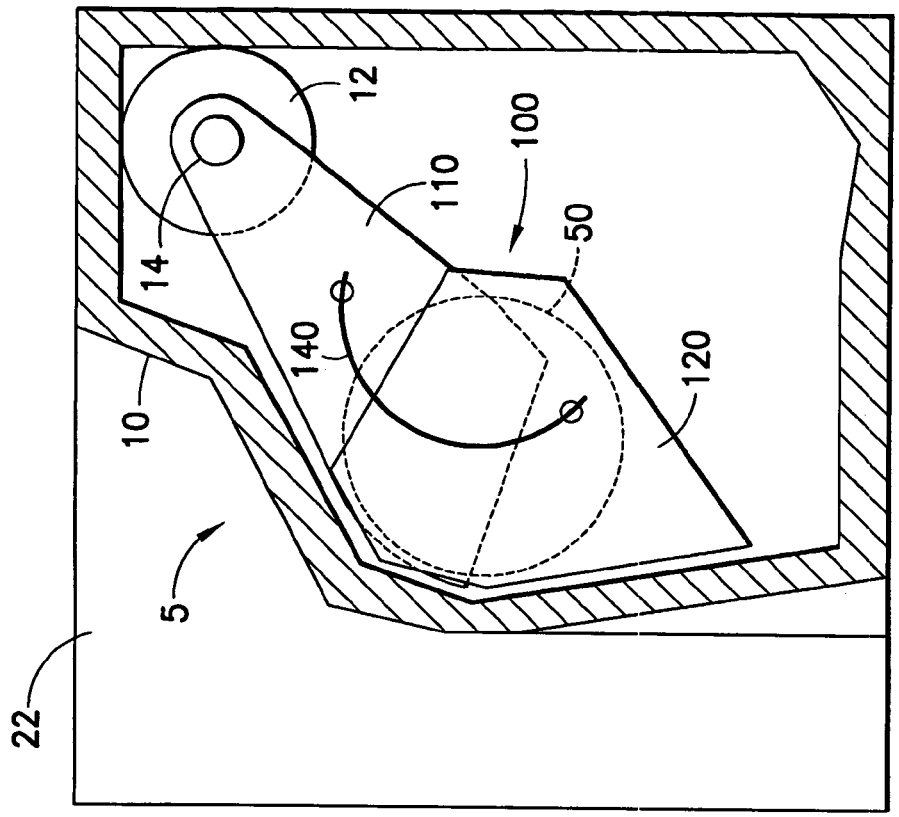
FIG. 11 shows a different way to movably connect the two halves of a shutter wing.
Figure 11A:
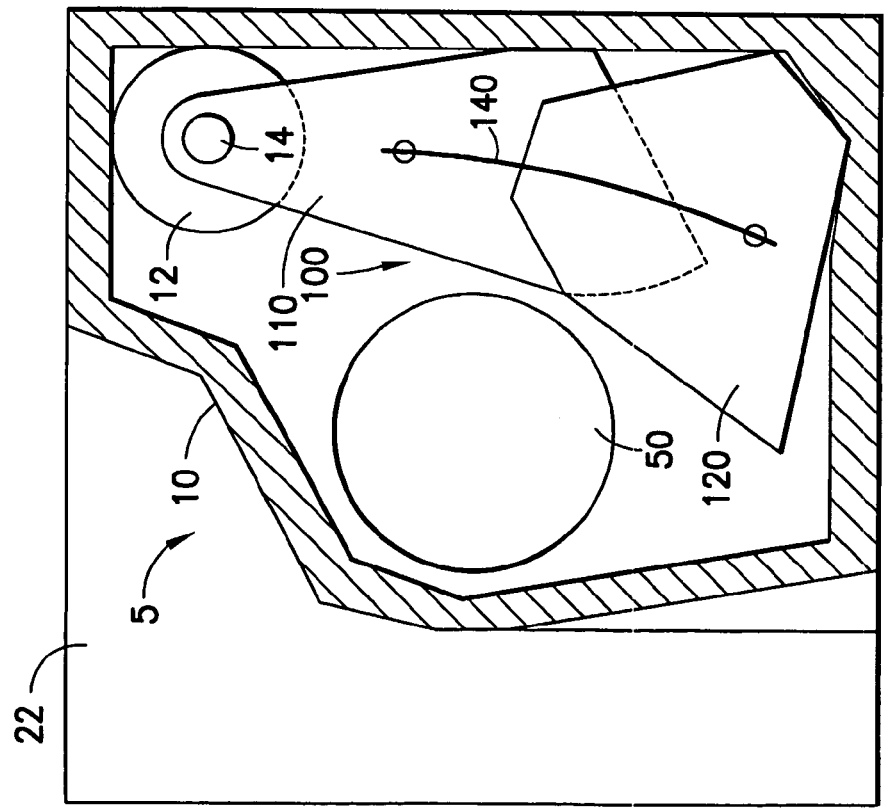

It should be noted that there are many ways to provide a rotatable connection between the first blade 110 and the second blade 120 of the shutter wing 100. For example, the second blade 120 can be movably connected to the first blade 110 by a flexible wire 140, as shown in FIGS. 11a and 11b. The wire 140 can be made of steel, another metal, or plastic, for example. The embodiments as shown in FIGS. 3a, 3b, 7a, 7b and 11a and 11b are only examples used to show how a simple foldable shutter wing can be constructed. When the shutter wing is in a closed position, it has a folded shape with a waste section wide enough to cover the entire aperture. When the shutter wing is in an open position, it has an extended shape with a reduced waist section. As such, the shutter wing requires much less space when it is in the open position.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:
1. A method for controlling exposure in a camera having aperture, comprising:
   providing a casing having casing walls;
   providing a first shutter blade having a first end and a second end, the first end connected to an actuator for rotational movement between a first position and a second position;
   rotatably connecting a second shutter blade to the second end of the first shutter blade, wherein
   when the first shutter blade is located in the first position, the first and second shutter blades form a folded shape over the aperture, and
   when the first shutter blade is located in the second position, both the first and second shutter blades are located away from the aperture and the first and second shutter blades form an extended shape with a reduced waist section, when the first shutter blade moves between the first position and the second position, the casing walls guide the second shutter blade.

2. The method of claim 1, wherein the first shutter blade has a first end and a second end, the second end movably connected to the second shutter blade, said method further comprising:
fixedly connecting the first end of the first shutter blade to an actuator for moving the shutter between the first and the second positions.

3. The method of claim 1, wherein the second shutter blade is connected to the first shutter blade via a hinge.

4. The shutter of claim 1, wherein the second shutter blade is connected to the first shutter blade by a wire.

5. A shutter assembly, comprising:
a casing having an aperture and casing walls;
a shutter disposed adjacent to the aperture, said shutter comprising:
a first shutter blade, and
a second shutter blade rotatably connected to the first shutter blade, wherein the casing walls are configured to guide the shutter between a first position blocking the aperture and a second position exposing the aperture, and wherein
when the shutter is located in the first position, the first shutter blade and the second shutter blade form a folded shape with a waist section larger than the aperture, and
when the shutter is located in the second position, the first shutter blade and the second shutter blade form an extended shape with a reduced waist section.

6. The shutter assembly of claim 5, wherein the first shutter blade has a first end and a second end, said shutter assembly further comprising:
an actuator mounted on the casing, wherein the first end is adapted for connecting to the actuator to allow the shutter to move between the first and the second positions, and the second end is movably connected to the second shutter blade.

7. The shutter assembly of claim 5, wherein the second shutter blade is connected to the first shutter blade via a hinge.

8. The shutter assembly of claim 5, wherein the second shutter blade is connected to the first shutter blade by a wire.

9. The shutter assembly of claim 6, wherein the actuator has a shaft mounted through a surface of the casing, and the first end of the first shutter blade is fixedly attached to the shaft for rotation.

10. The shutter assembly of claim 9, wherein the aperture is provided on the casing surface.

11. The shutter assembly of claim 9, wherein
the casing surface has a first side and an opposing second side;
the aperture is provided on the casing surface between the first side and the second side, and
the shutter is located on the first side when the shutter is located in the first position and wherein the actuator is adapted for moving the shutter from the first side toward the second side to the second position, said shutter assembly further comprising:
a second shutter disposed on the second side, the second shutter comprising:
a third shutter blade rotatably connected to a second actuator, and
a fourth shutter blade rotatably connected to the third shutter blade, wherein the second shutter is operable between a third position blocking the aperture and a fourth position exposing the aperture, and wherein when the second shutter is located in the third position, the third shutter blade and the fourth shutter blade form a folded shape with a waist section larger than the aperture;
when the second shutter is located in the fourth position, the third shutter blade and the fourth shutter blade form an extended shape with a reduced waist section; and
the second shutter is located on the second side when the second shutter is located in the fourth position and the second actuator is adapted for moving the second shutter from the second side toward the first side to the third position.

12. The shutter assembly of claim 11, wherein only one of the first and second shutters is adapted to block the aperture at a time.

13. The shutter assembly of claim 11, wherein the first and second shutters are adapted to move between the first side and the second side in a moving direction, forming a gap between the first and second shutters.

14. The shutter assembly of claim 13, wherein the first and second actuators are adapted for moving the first and second shutters independently in a coordinated fashion so as to adjust the gap between the first and second shutters.

15. A shutter assembly as claimed in claim 5, wherein the casing walls are configured to guide the second shutter blade, when the shutter moves from the first position to the second position, such that the first and second shutter blades change forming the folded shape to forming the extended shape.

16. A shutter assembly as claimed in claim 5, wherein the casing walls are configured to guide the second shutter blade, when the shutter moves from second position to the first position, such that the first and second shutter blades change from forming the extended shape to forming the folded shape.

17. A mobile phone comprising an imaging device having a shutter assembly according to claim 5.

18. A device comprising:
an imaging sensor;
a casing having an aperture and casing walls;
an optical unit for forming an image on the imaging sensor with light through the aperture; and
a shutter disposed adjacent to the aperture, said shutter comprising:
a first shutter blade, and
a second shutter blade rotatably connected to the first shutter blade, wherein the casing walls are configured to guide the shutter between a first position blocking the aperture and a second position exposing the aperture, and wherein
when the shutter is located in the first position, the first shutter blade and the second shutter blade form a folded shape with a waist section larger than the aperture, and
when the shutter is located in the second position, the first shutter blade and the second shutter blade form an extended shape with a reduced waist section.

19. A device as claimed in claim 18, wherein the casing walls are configured to guide the second shutter blade, when the shutter moves from the first position to the second position, such that the first and second shutter blades change forming the folded shape to forming the extended shape.

20. A device as claimed in claim 18, wherein the casing walls are configured to guide the second shutter blade, when the shutter moves from second position to the first position, such that the first and second shutter blades change from forming the extended shape to forming the folded shape.

* * * * *